US012043522B2

(12) United States Patent
Laitinen et al.

(10) Patent No.: US 12,043,522 B2
(45) Date of Patent: Jul. 23, 2024

(54) METHOD FOR CONSTRUCTING ELEVATOR AND ELEVATOR

(71) Applicant: Kone Corporation, Helsinki (FI)

(72) Inventors: Jukka Laitinen, Helsinki (FI); Anssi Venho, Helsinki (FI); Ville Myyrylainen, Helsinki (FI); Tarvo Viita-Aho, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 17/490,369

(22) Filed: Sep. 30, 2021

(65) Prior Publication Data

US 2022/0024723 A1 Jan. 27, 2022

Related U.S. Application Data

(63) Continuation of application No. PCT/EP2020/065648, filed on Jun. 5, 2020.

(30) Foreign Application Priority Data

Jun. 5, 2019 (EP) .................................... 19178480

(51) Int. Cl.

*B66B 7/02* (2006.01)
*B66B 11/00* (2006.01)
*E04F 17/00* (2006.01)

(52) U.S. Cl.

CPC .............. *B66B 7/026* (2013.01); *B66B 7/021* (2013.01); *B66B 7/025* (2013.01); *B66B 11/0045* (2013.01); *E04F 17/005* (2013.01)

(58) Field of Classification Search

CPC ......... B66B 7/026; B66B 7/021; B66B 7/025; B66B 11/0045; B66B 11/0005; E04F 17/005

See application file for complete search history.

(56) References Cited

U.S. PATENT DOCUMENTS 2,463,215 A 3/1949 Strachan
3,991,528 A * 11/1976 Dillon ................. B66B 11/0005 52/79.14

(Continued)

FOREIGN PATENT DOCUMENTS

CN 1374924 A 10/2002
CN 112900791 A * 6/2021 ............... E04B 1/20

(Continued)

OTHER PUBLICATIONS

EP0913353-Machine Translation (Year: 1999).*

(Continued)

*Primary Examiner* — Michael A Riegelman

(74) *Attorney, Agent, or Firm* — Harness, Dickey & Pierce, P.L.C.

(57) ABSTRACT

The invention relates to a method for constructing an elevator, comprising providing an elevator car; providing plurality of prefabricated hoistway modules to be piled on top of each other, each hoistway module bordering a hoistway space into which the whole elevator car or at least an upper or lower end thereof can be fitted to move; and piling said plurality of prefabricated modules on top of each other, such that the hoistway spaces of the prefabricated modules are vertically aligned forming a continuous vertically elongated hoistway where the elevator car can be fitted to move; and arranging the elevator car to be vertically movable in the hoistway. The invention also relates to an elevator obtained with the method.

19 Claims, 8 Drawing Sheets

(56) References Cited

U.S. PATENT DOCUMENTS

| | | | | | |
|---|---|---|---|---|---|
| 4,986,041 | A * | 1/1991 | Prewer | E04F 17/005 52/270 |
| 5,644,871 | A * | 7/1997 | Cohen | E04B 5/04 52/125.4 |
| 6,830,131 | B2 | 12/2004 | Mustalahti et al. | |
| 8,800,724 | B1 * | 8/2014 | Foster | B66B 19/00 187/414 |
| 2002/0070080 | A1 | 6/2002 | Nakagaki et al. | |
| 2002/0108815 | A1 * | 8/2002 | Mustalahti | B66B 11/0045 187/254 |
| 2012/0110928 | A1 * | 5/2012 | Liberman | E04G 21/14 52/122.1 |
| 2012/0168263 | A1 * | 7/2012 | Alois | B66B 19/002 52/745.03 |
| 2017/0121151 | A1 * | 5/2017 | Watanabe | B66B 11/0045 |
| 2018/0127242 | A1 * | 5/2018 | Witczak | B66B 11/0005 |
| 2020/0217087 | A1 * | 7/2020 | Greschbach | B66B 11/0005 |
| 2021/0269282 | A1 * | 9/2021 | Skovajsa | E04F 17/005 |
| 2021/0395042 | A1 * | 12/2021 | Collins | B66B 19/002 |
| 2022/0024723 | A1 * | 1/2022 | Laitinen | B66B 19/00 |
| 2022/0055862 | A1 * | 2/2022 | Wang | B66B 19/00 |
| 2022/0274804 | A1 * | 9/2022 | Li | B66B 11/0005 |

FOREIGN PATENT DOCUMENTS

| | | | | |
|---|---|---|---|---|
| CN | 113152691 | A * | 7/2021 | |
| DE | 2755267 | A1 | 6/1979 | |
| DE | 29718047 | U1 | 2/1999 | |
| DE | 20218454 | U1 | 3/2003 | |
| EP | 0688735 | A2 | 12/1995 | |
| EP | 0913353 | A1 | 5/1999 | |
| EP | 2559647 | A1 | 2/2013 | |
| JP | 2002-003123 | A | 1/2002 | |
| NL | 2002869 | C2 | 11/2010 | |
| WO | 2000/027739 | A1 | 5/2000 | |
| WO | WO-02090232 | A1 * | 11/2002 | B66B 11/008 |
| WO | WO-2022233350 | A1 * | 11/2022 | |

OTHER PUBLICATIONS

International Search Report PCT/ISA/210 for International Application No. PCT/EP2020/065648 Dated Jun. 5, 2020.

Written Opinion of the International Searching Authority PCT/ISA/237 for International Application No. PCT/EP2020/065648 dated Jun. 5, 2020.

Chinese Office Action dated Nov. 1, 2022 for corresponding Chinese Application No. 202080039381.8.

Chinese Office Action dated Feb. 19, 2024 for corresponding Chinese Patent Application No. 202080039381.8.

Bachmann, Oliver: "Aufzüge und Fahrtreppen: Technik, Planung ung Design", Landsberg/Lech: Verl. Moderne Industrie, pp. 24-27, 1992.

Notice of Opposition against EP 3747820 dated May 23, 2024.

Notice of Opposition against EP 3747820 dated May 15, 2024.

Consolidated List of Documents Cited in Notices of Opposition against EP 3747820, May 2024.

* cited by examiner

METHOD FOR CONSTRUCTING ELEVATOR AND ELEVATOR

CROSS-REFERENCE TO RELATED APPLICATION

This application is a continuation of PCT International Application No. PCT/EP2020/065648 which has an International filing date of Jun. 5, 2020, and which claims priority to European patent application number 19178480.0 filed Jun. 5, 2019, the entire contents of both of which are incorporated herein by reference.

FIELD OF THE INVENTION

The invention relates to a method for constructing an elevator, and to an elevator, wherein the elevator preferably is an elevator for vertically transporting passengers and/or goods.

BACKGROUND OF THE INVENTION

Conventionally, elevators have been built from components into a prefabricated hoistway or a hoisway is fabricated concurrently with the other parts of the elevator. A drawback has been that all elevator installation work taking place at the construction site consumes time and complicates logistics of the construction site. A drawback has also been that accurate positioning of components has required lots of adjustment at the site. Also modular elevator solutions have been used, where an elevator is partly built from several modules, but the known solution have not excelled in efficiency and swiftness and simplicity of the process, while maintaining it possible to use normal elevator components and to install the elevator relatively freely to any kind of building.

BRIEF DESCRIPTION OF THE INVENTION

The object of the invention is to provide a method for constructing an elevator and an elevator, which are improved in terms of efficiency and accuracy of construction work of the elevator. An object is particularly to alleviate one or more of the above defined drawbacks of prior art and/or problems discussed or implied elsewhere in the description.

An object is particularly to provide a solution with high level of readiness to form from elevator installation material quickly a complete and well functioning elevator and to take it into use swiftly after bringing the elevator installation material to a construction site, this being made possible without much excessive installation and adjustment work needed at the site. An object is to provide an elevator layout and structural aspects, such as materials and special component relations, which together contribute towards the aforementioned object by facilitating simplicity and easiness of steps required to form a complete elevator and to take it into use after bringing the elevator installation material to a construction site.

Embodiments are disclosed, inter alia, where a counterweighted machine-roomless elevator is achieved while the objects mentioned above are realized.

It is brought forward a new method for constructing an elevator, the method comprising providing an elevator car; providing plurality of prefabricated hoistway modules to be piled on top of each other, each hoistway module bordering a hoistway space into which the whole elevator car or at least an upper or lower end thereof can be fitted to move; and piling said plurality of prefabricated modules on top of each other, such that the hoistway spaces of the prefabricated modules are vertically aligned forming a continuous vertically elongated hoistway where the elevator car can be fitted to move; and arranging the elevator car to be vertically movable in the hoistway. With this solution, one or more of the above mentioned advantages and/or objectives are achieved.

Preferable further features are introduced in the following, which further features can be combined with the method individually or in any combination.

In a preferred embodiment, each said prefabricated module comprises a tubular frame around the hoistway space of the module, which tubular frame forms the bearing structure of the module in question.

In a preferred embodiment, in said piling, said plurality of prefabricated modules are piled on top of each other such that the tubular frame of each prefabricated module carries the weight of the tubular frame of all the prefabricated modules piled on top of it.

In a preferred embodiment, in said arranging the elevator car is arranged to be vertically movable in the hoistway along one or more car guide rail lines for guiding the elevator car.

In a preferred embodiment, wherein each said prefabricated hoistway module comprises one or more car guide rail sections. Each said car guide rail section is suitable for forming a section of a longer guide rail line for guiding the car.

In a preferred embodiment, wherein each said car guide rail section is fixed on the tubular frame with at least one fixing bracket.

In a preferred embodiment, wherein the car guide rail sections of the prefabricated hoistway modules have been positioned in the prefabricated modules such that when the hoistway modules are piled on top of each other, the car guide rail sections of the modules become vertically aligned forming one or more continuous vertical guide rail lines for guiding the elevator car.

In a preferred embodiment, wherein the method comprises providing a counterweight. The whole counterweight or at least an upper or lower end thereof can be fitted to move into the hoistway space of each hoistway module. In said arranging the counterweight is arranged to be vertically movable in the hoistway along one or more car guide rail lines for guiding the elevator car.

In a preferred embodiment, wherein each said prefabricated hoistway module comprises one or more counterweight guide rail sections. Each said counterweight guide rail section is suitable for forming a section of a longer guide rail line for guiding the counterweight.

In a preferred embodiment, wherein each said counterweight guide rail section is fixed on the tubular frame with at least one fixing bracket.

In a preferred embodiment, wherein the counterweight guide rail sections of the prefabricated hoistway modules have been positioned in the prefabricated modules such that when the hoistway modules have been piled on top of each other, the counterweight guide rail sections of the prefabricated hoistway modules become vertically aligned forming one or more continuous vertical guide rail lines for guiding the counterweight.

In a preferred embodiment, each said car guide rail section is fixed with at least one fixing bracket on a horizontal beam of the frame of the prefabricated module, in particular on a horizontal beam of the beam frame or on a horizontal beam of the concrete frame, which horizontal beam is embedded in concrete of the concrete frame.

In a preferred embodiment, each said counterweight guide rail section is fixed with at least one fixing bracket on a horizontal beam of the frame of the prefabricated module in question, in particular on a horizontal beam of the beam frame or on a horizontal beam of the concrete frame, which horizontal beam is embedded in concrete of the concrete frame.

In a preferred embodiment, the plurality of prefabricated hoistway modules comprise a prefabricated top module comprising a machinery for driving a hoisting roping.

In a preferred embodiment, the plurality of prefabricated hoistway modules comprise a prefabricated pit module.

In a preferred embodiment, the plurality of prefabricated hoistway modules comprise one or more intermediate modules into and through which the whole elevator car can be fitted to move.

In a preferred embodiment, each said tubular frame is a beam frame, in particular comprising plurality of beams. Preferably, the beam frame comprises horizontal beams, vertical beams and diagonal beams rigidly connected together. Preferably, said beams of the beam frame include four vertical corner beams, which are connected by horizontal beams, and plurality of diagonal beams extending at an inclined angle in a space bordered by two vertical beams and two horizontal beams. The opposite ends of each diagonal beams is attached, preferably by welding, to two other beams, most preferably to a vertical beam and a horizontal beam.

In a preferred embodiment, the beams of the beam frame include at least four vertical corner beams, which are connected by horizontal beams such that a rectangular cuboid structure is formed.

In a preferred embodiment, the beams of the beam frame are tubular metal beams. Hereby, the beam frame is rigid and light whereby large modules can be formed and lifted into place. This structure also reduces forces to be beared when piled, whereby a high pile of modules is possible.

In a preferred embodiment, the beams of the beam frame have one or more planar side faces.

In a preferred embodiment, the tubular frame of said prefabricated module is a concrete frame comprising concrete or reinforced concrete, concrete or reinforced concrete preferably forming more than 50% of the weight of the frame.

In a preferred embodiment, the concrete frame comprises four vertical concrete walls rigidly connected together and bordering the hoistway space of the module in question.

In a preferred embodiment, the concrete frame comprises a horizontal beam embedded in concrete of the concrete frame.

In a preferred embodiment, the prefabricated top module comprises one or more car guide rail sections, and the machinery is mounted on a car guide rail section of the prefabricated top module to be vertically carried by the car guide rail section. Hereby, these components critical to both the hoisting function of the elevator and to car guidance of the elevator can be positioned efficiently already at the factory relative to each other with high accuracy and with good performance and firm support later when an elevator car is later made to be suspended and guided by them. Being this way in the top module, the machinery and guide rail on which it is mounted can be simply made to share positioning and support both in lateral and vertical direction during transportation, construction work and later during use of the elevator. A connection of these components with the frame of the top module, e.g. via bracket(s), can provide lateral support efficiently, and also at least an amount of vertical support which can be complemented with additional support given by the lower parts of the guide rail line extending below the guide rail section on which the machinery is mounted, which may be advantageous or even necessary, when the hoisting roping exerts high vertical loads on the machinery during use of the elevator. Preferably, the machinery is mounted on the back-side of the car guide rail section. Here, said back side is the side opposite to the side on which side the elevator car is movable in the hoistway guided by the guide rail line in question when viewed in vertical direction.

In a preferred embodiment, wherein the prefabricated top module comprises one or more rope fixing brackets on which an end of a hoisting roping can be fixed, one or more of said rope fixing brackets preferably being fixed on the frame of the top module, preferably on a horizontal beam of the frame of the top module.

In a preferred embodiment, wherein the machinery for driving a hoisting roping comprises a motor and a drive wheel. The motor is preferably an electric motor.

In a preferred embodiment, the motor and a drive wheel are coaxial, preferably the drive sheave fixedly connected with the rotor of the motor.

In a preferred embodiment, wherein the machinery is mounted by one or more supporting brackets on a guide rail section.

In a preferred embodiment, wherein each said guide rail section has T-shaped cross section.

In a preferred embodiment, wherein each said guide rail section is made of metal.

In a preferred embodiment, the top module does not comprise a doorway leading away from the hoistway space thereof. Then, preferably the top module is lower than the elevator car.

In a preferred embodiment, said arranging the elevator car to be vertically movable in the hoistway comprises suspending the elevator car, and a counterweight, with a hoisting roping passing around a drive wheel.

In a preferred embodiment, one or more ends of a hoisting roping are fixed on said one or more rope fixing brackets.

In a preferred embodiment, during said piling the elevator car is at least partially inside the hoistway space of one of the prefabricated modules, preferably the pit module.

In a preferred embodiment, during said piling a counterweight is at least partially inside the hoistway space of one of the prefabricated modules, preferably the pit module.

In a preferred embodiment, one or more of the prefabricated hoistway modules comprises a doorway leading away from the hoistway space of the module in question. Preferably, the prefabricated hoistway module comprising a doorway further comprises a hoistway door for openably covering at least partially the hoistway doorway. Preferably, the door is a sliding door mounted on one or more door guide rails mounted on the frame of the prefabricated hoistway module in question. The door preferably comprises one or more door leaves. Preferably, during said piling the door is locked immovable relative to the frame of the prefabricated hoistway module in question.

In a preferred embodiment, wherein the prefabricated pit module comprises one or more buffers, including a buffer for stopping descent of the elevator car and/or a buffer for stopping descent of a counterweight.

The elevator is preferably moreover constructed such that the elevator car is automatically vertically movable between two or more vertically displaced landings in response to signals from user one or more interfaces, preferably user interfaces located at landings or a user interface inside the elevator car or user interfaces formed by applications installed on a mobile device such as mobile phone or table for instance, or from any combination of these different interfaces. Preferably, the car has an interior space suitable for receiving a passenger or passengers, and the car can be provided with a door for forming a closed interior space, such as an automatic door.

It is also brought forward a new elevator obtained with the method described above or elsewhere in the application, such as in any of the claims of the application. With this solution, one or more of the above mentioned advantages and/or objectives are achieved.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
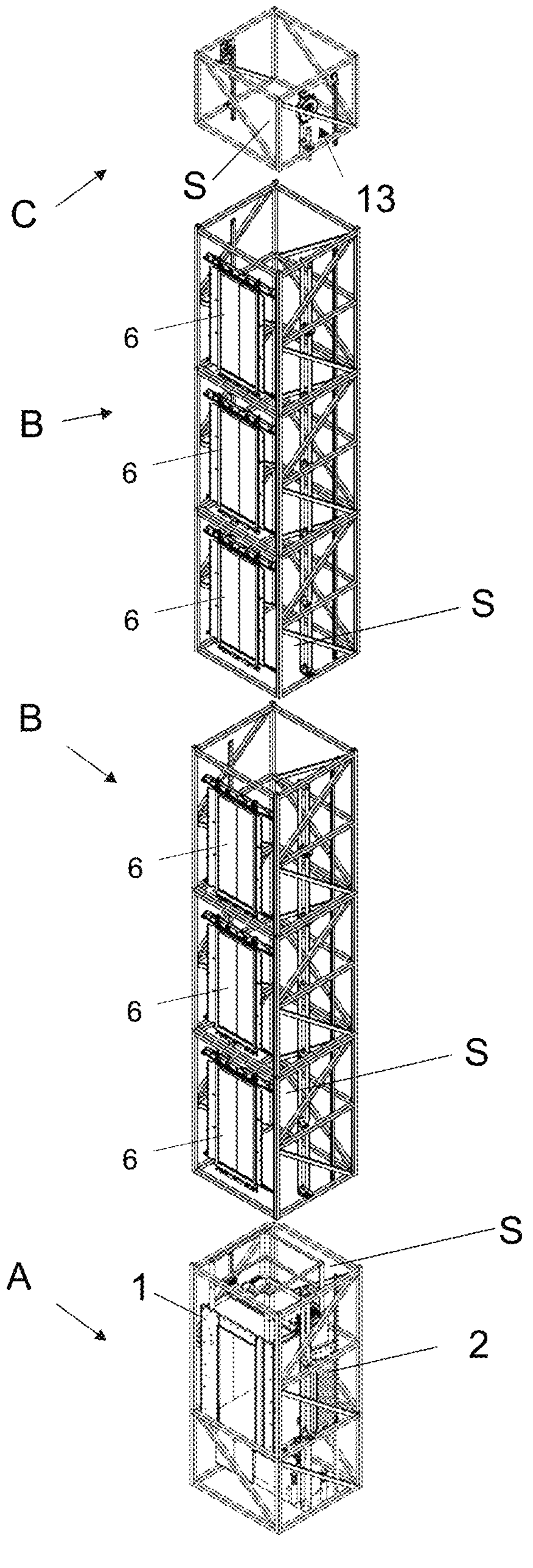
FIG. 1 illustrates a phase in an embodiment of a method of a first kind of for constructing an elevator.
Figure 9:
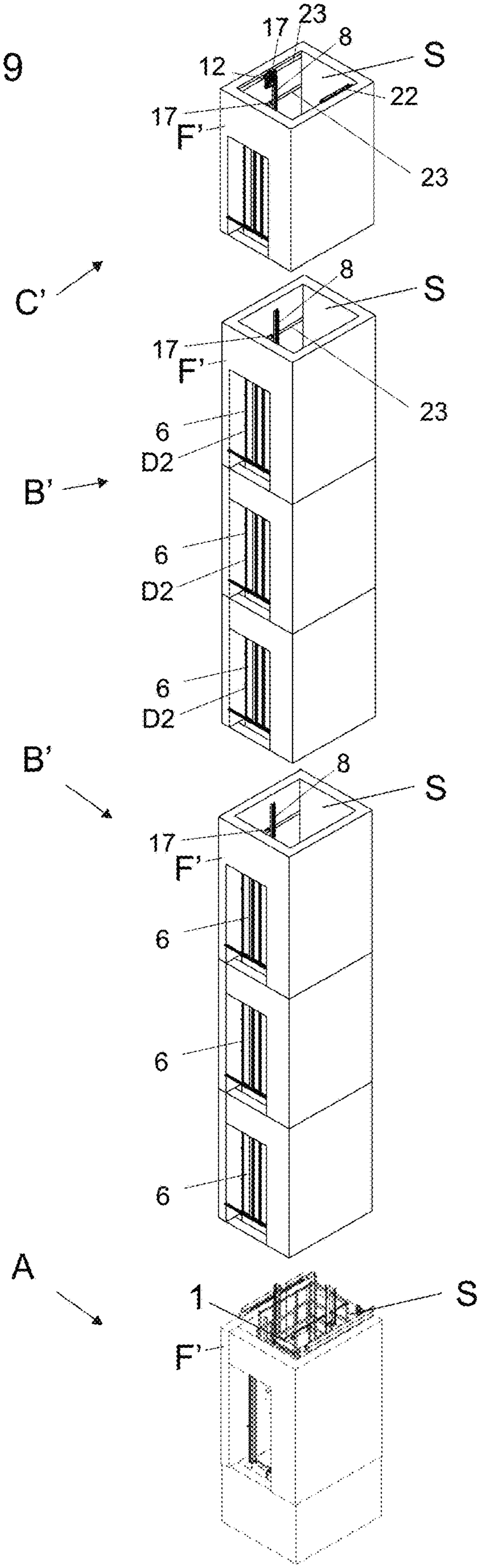
FIG. 9 illustrates a phase in an embodiment of a method of a second kind of for constructing an elevator.

FIGS. 1 and 9 illustrate each a phase in an embodiment of a method for constructing an elevator. FIG. 1 illustrates a first kind of embodiment, where a metal beam frame F is utilized, FIG. 9 illustrates a second kind of embodiment, where a concrete frame F' is utilized. In each case, in this phase of the method, a plurality of prefabricated hoistway modules A,B,C; A',B',C' to be piled on top of each other are provided. Also an elevator car 1 is provided. In the embodiments of FIGS. 1 and 9, the elevator car 1 is inside the hoistway space S of one A of the prefabricated hoistway modules.

Figure 2:
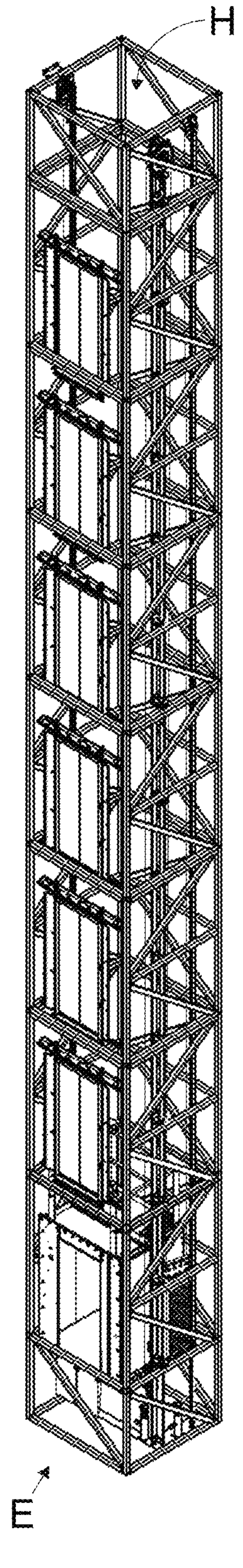
FIG. 2 illustrates an elevator constructed by the method of said first kind.
Figure 3:
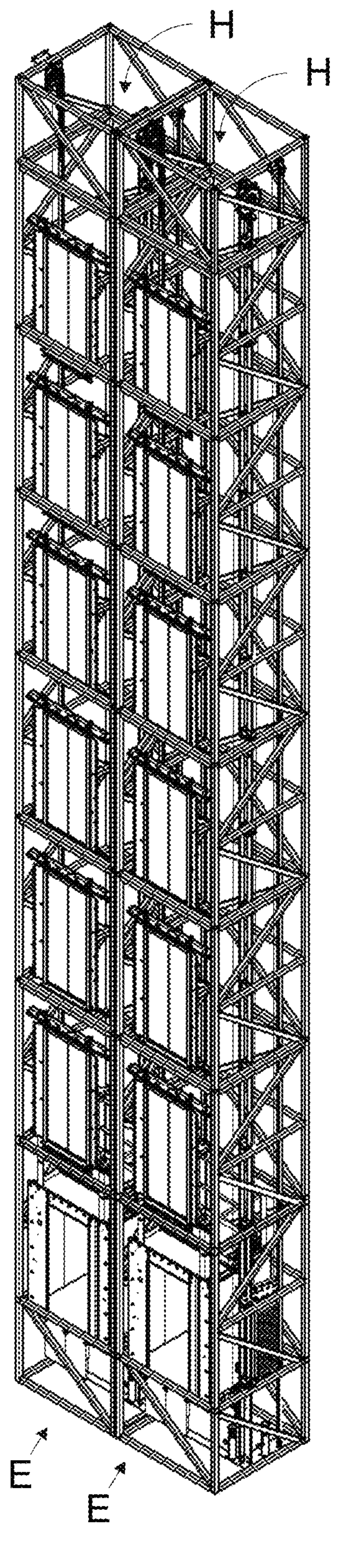
FIG. 3 illustrates two adjacent elevators constructed by the method of said first kind

Each hoistway module A,B,C; A',B',C' borders a hoistway space S into which the whole elevator car 1 or at least the upper or lower end thereof can be fitted to move. Hereby, the hoistway space S in question is large enough to envelope the whole elevator car 1 or at least an upper or lower end thereof. In the method, said plurality of prefabricated modules A,B,C; A',B',C' are piled on top of each other to be as illustrated in FIG. 2, such that the hoistway spaces S of the prefabricated modules A,B,C; A',B',C' are vertically aligned forming a continuous vertically elongated hoistway H where the elevator car 1 can be fitted to move. After this, the method comprises arranging the elevator car 1 to be vertically movable in the hoistway H.

Each said prefabricated module A,B,C; A',B',C' comprises a tubular frame F;F' around the hoistway space S of the module A,B,C; A',B',C', which tubular frame F;F' forms the bearing structure of the module A,B,C; A',B',C' in question. The tubularity of the frame F;F' provides that it surrounds laterally the hoistway space S of the module A,B,C; A',B',C'. Tubular structure is advantageous since it increases rigidity and integrality of the individual modules and rigidity and integrality of the resulting pile of modules A,B,C; A',B',C'.

In said piling, said plurality of prefabricated hoistway modules A,B,C; A',B',C' are piled on top of each other, such that the tubular frame F;F' of each prefabricated module A,B carries the weight of the tubular frame F;F' of all the prefabricated hoistway modules B,C piled on top of it.

In the preferred embodiments presented in FIGS. 1 and 9, the plurality of prefabricated hoistway modules A,B,C; A',B',C' comprise a prefabricated top module C, a prefabricated pit module A and prefabricated intermediate modules B into and through which the whole elevator car 1 can be fitted to move. The pit module A is first placed in a desired installation location of the elevator to be constructed. This location can be inside a building under construction, inside an existing building or beside the outer side face of inside a building under construction, inside an existing building, for instance. After this, the prefabricated intermediate modules B and the top module C are piled on top of it one by one, such that the tubular frame F;F' of each prefabricated module A,B carries the weight of the tubular frame F;F' of all the prefabricated hoistway modules B,C piled on top of it.

In said arranging the elevator car 1 is arranged to be vertically movable in the hoistway H along two guide rail lines for guiding the elevator car 1. Each said prefabricated hoistway module A,B,C; A',B',C' provided in said providing comprises guide rail sections 8 of the guide rail lines for guiding the elevator car 1. Each said guide rail section 8 is suitable for forming a section of a longer guide rail line for guiding the car 1. Each said guide rail section 8 (also referred to as a car guide rail section) is fixed on the tubular frame F;F' with at least one fixing bracket 17. The car guide rail sections 8 of the prefabricated hoistway modules A,B,C; A',B',C' have been positioned in the prefabricated modules such that when the hoistway modules A,B,C; A',B',C' are piled on top of each other, the guide rail sections 8 of the modules A,B,C; A',B',C' become vertically aligned forming one or more (in the examples two) continuous vertical guide rail lines for guiding the elevator car 1.

In FIGS. 1 and 9, the elevator E,E' to be constructed is a counterweighted elevator. Therefore, the method moreover comprises providing counterweight 2, wherein the whole counterweight 2 or at least an upper or lower end thereof can be fitted to move into the hoistway space S of each hoistway module A,B,C; A',B',C'. Hereby, the hoistway space S in question is large enough to envelope the whole elevator car 1 or at least an upper or lower end thereof. In the step of arranging the elevator car 1 to be vertically movable in the hoistway, also the counterweight 2 is arranged to be vertically movable in the hoistway H, in particular along two guide rail lines for guiding the counterweight.

Each said prefabricated hoistway module A,B,C; A',B',C' provided in said providing comprises guide rail sections 9 of two guide rail lines for guiding the counterweight 2. Each said guide rail section 9 is suitable for forming a section of a longer guide rail line for guiding the counterweight 2. Each said guide rail section 9 (also referred to as a counterweight guide rail section) is fixed on the tubular frame F;F' with at least one fixing bracket 17. The counterweight guide rail sections 9 of the prefabricated hoistway modules A,B,C; A',B',C' have been positioned in the prefabricated modules such that when the hoistway modules A,B,C; A',B',C' are piled on top of each other, guide rail sections 9 of the modules become vertically aligned forming one or more (in the examples two) continuous vertical guide rail lines for guiding the counterweight 2. The same fixing bracket 17 can be used for fixing a guide rail section 8 of the elevator car 1 and a guide rail section 9 of the counterweight 2.

The elevator car 1 is at least partially inside the hoistway space S of one A of the prefabricated modules to be piled, preferably the pit module A. Likewise, the counterweight 2 is at least partially inside the hoistway space S of one A of the prefabricated modules to be piled, preferably the prefabricated pit module A.

In the preferred embodiments presented in FIGS. 1 and 9, the top module comprises a machinery 13 for driving a hoisting roping 21.

In the embodiment of FIG. 1, the tubular frame F of each said prefabricated module A,B,C is a beam frame F. In the embodiment of FIG. 1, the beam frame F comprises horizontal beams 14*a*, vertical beams 14*b* and diagonal beams 14*c* rigidly connected together. Said beams include four vertical corner beams 14*b*, which are connected by horizontal beams 14*a*, and plurality of diagonal beams 14*c* extending at an inclined angle in a space bordered by two vertical beams 14*b* and two horizontal beams 14*a*. The opposite ends of each diagonal beams is attached, preferably by welding, to a vertical beam 14*b* and a horizontal beam 14*a*. Said four vertical corner beams are connected by horizontal beams such that they form a rectangular cuboid structure is formed.

Generally, the beams 14*a*,14*b*,14*c* are preferably tubular metal beams. Thus, the beam frame F is rigid and light whereby large modules can be formed, transported and lifted into place. Light weight reduces forces to be beared in piling, whereby a high pile of modules is possible.

Generally, the beams 14*a*,14*b*,14*c* preferably have one or more planar side faces, such as four planar side faces as illustrated, whereby fixing elevator components to them is facilitated.

Figure 4:
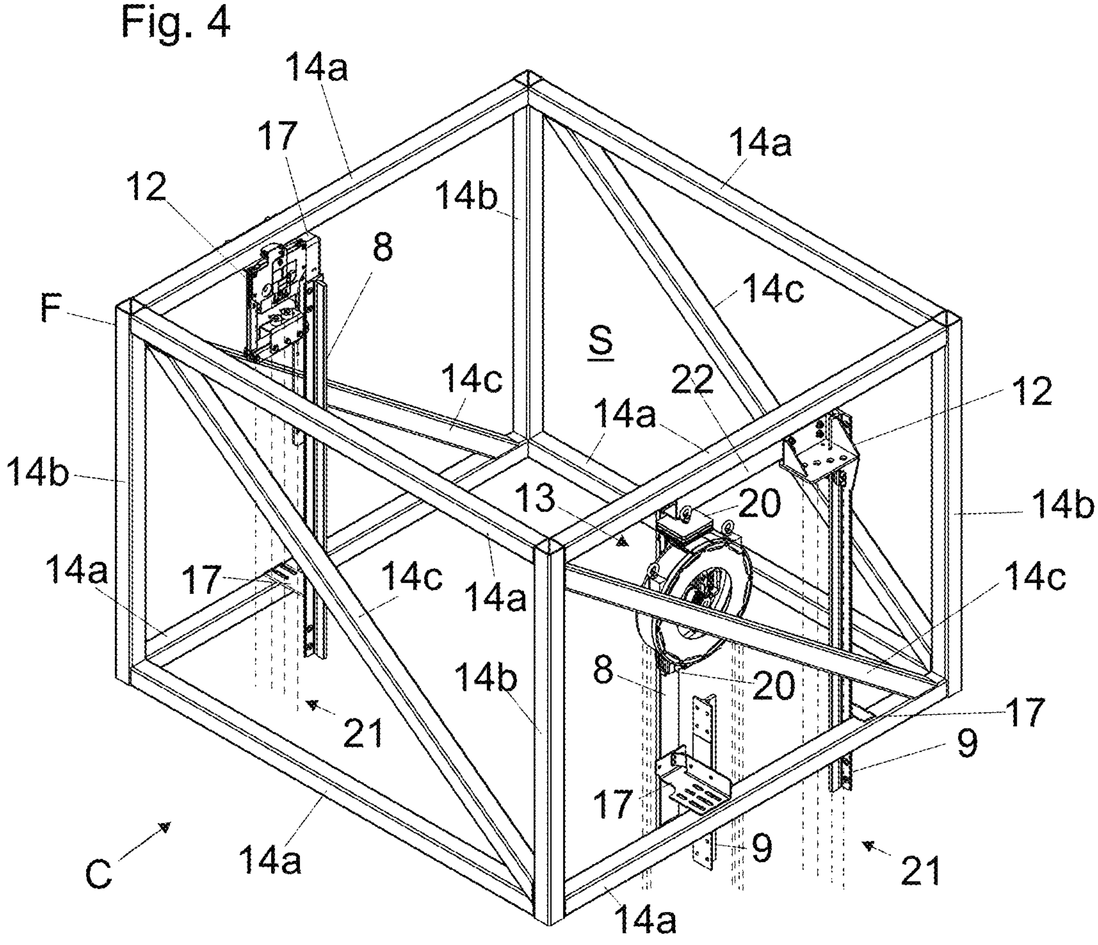
FIG. 4 illustrates preferred details of a prefabricated top module used in the method of the first kind.
Figure 5:
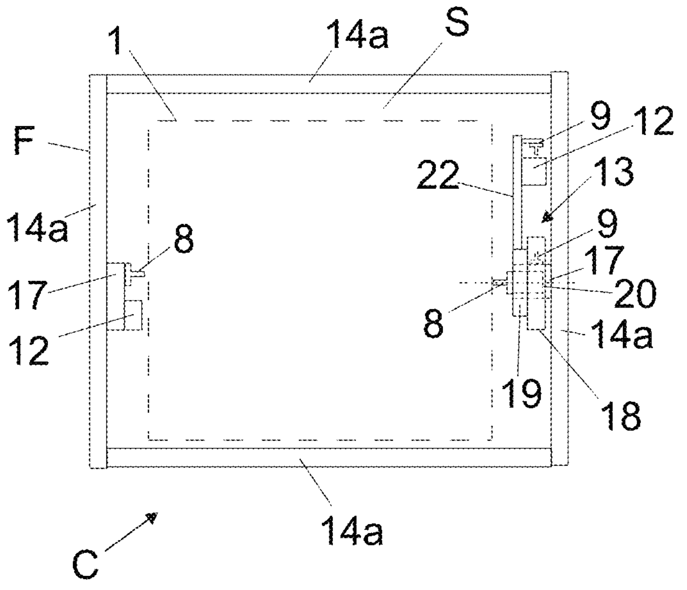
FIG. 5 illustrates preferred details of layout of the top module.

FIG. 4 illustrates preferred details of the prefabricated top module C. FIG. 5 illustrates the layout of the top module C of FIG. 4. The prefabricated top module C illustrated in FIG. 4 comprises guide rail sections 8 of two guide rail lines for guiding the elevator car 1 and guide rail sections 9 of two guide rail lines for guiding the counterweight 2. The prefabricated top module C comprises a machinery 13 for driving a hoisting roping 21 (illustrated in broken line).

The machinery 13 for driving a hoisting roping comprises a motor 18 and a drive wheel 19. The machinery 13 is mounted on a guide rail section 8 of a guide rail line for guiding the elevator car 1 to be vertically carried by the guide rail section 8. Thus, the weight of the machinery 13, as well as the load exerted by the roping 21 passing around the drive wheel 19, is carried by the guide rail section 8, and transmittable by the guide rail section to the guide rail sections below it at least partly so that the complete weight of the of the machinery 13, as well as the load exerted by the roping 21 passing around the drive wheel 19. The load exerted by the roping 21 passing around the drive wheel 19 here is formed partially by weight of the roping 21 and partially by the elevator units, such as car 1 and counterweight 2 suspended by it. The total weight to be carried by the guide rail section 8 on which the machinery is mounted is hereby great. Therefore, the possibility that the guide rail line can carry at least partly the weight is advantageous in facilitating simple mounting of the guide rail sections by a small number of compact and light weighted brackets.

The machinery 13 is mounted on the back-side of a guide rail section 8 by one or more supporting brackets 20 on a guide rail section 8. Here, said back side is the side opposite to the front side the guide rail section 8, which front side is the side on which side the elevator car 1 is arranged movable in the hoistway guided by the guide rail line in question when viewed in vertical direction. The motor 18 and the drive wheel 19 are coaxial, the drive wheel being fixedly connected with the rotor of the motor 18. Hereby, they can be compactly placed on the back side of the guide rail section 8. The motor can be a flat electric motor, meaning a motor the size of which is substantially smaller in its axial direction than its radial direction. Preferably, the size of the motor in its axial direction is substantially less than 50% of its size in its radial direction.

Each said guide rail section 8 of a guide rail line for guiding the elevator car 1 is fixed on a horizontal beam 14*a* of the beam frame F, in particular with at least one fixing bracket 17.

The prefabricated top module C moreover comprises rope fixing brackets 12. On each of them, an end of a hoisting roping 21 can be fixed. As illustrated in FIG. 4, a rope fixing bracket 12 (on the left in FIGS. 4 and 5) is fixed on a fixing bracket 17 of a car guide rail section 8 fixed on a car guide rail section 8 and on a horizontal beam 14*a* of the beam frame F. This is advantageous since hereby the car guide rail section 8 and the rope fixing bracket 12 are positioned laterally relative to each other and relative to the beam frame F. Also, hereby the guide rail line can at least partially carry the load exerted on the rope fixing bracket 12 by the roping 21. As illustrated in FIG. 4, a rope fixing bracket 12 (on the right in FIGS. 4 and 5) is fixed on a horizontal beam 22 fixed on a car guide rail section 8 and on a counterweight guide rail section 8, which beam connects these to each other. By aid of the beam 22, the placement of the rope fixing bracket 12 in question can be placed relatively freely. This is advantageous also because hereby the car and counterweight guide rail lines can at least partially carry the load exerted on the rope fixing bracket 12 by the roping 21. An end of a hoisting roping 21 is fixed on each said rope fixing brackets 12.

In the embodiment of FIG. 4, the prefabricated top module C does not comprise a doorway leading away from the hoistway space S thereof. In the embodiment of FIG. 4, the prefabricated top module C is lower than the elevator car 1. In the embodiment of FIG. 4, the prefabricated top module C thus forms a relatively low structure into which the car can partially be driven, at least in the case where the car or counterweight travels above its intended uppermost position during transport use.

Figure 6:
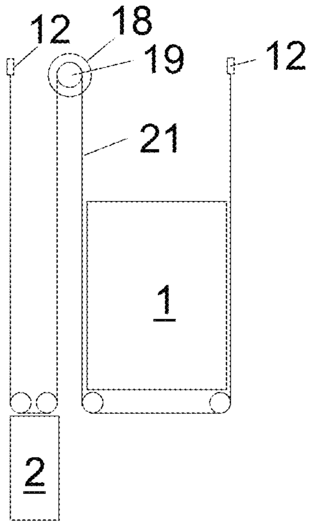
FIG. 6 illustrates preferred details of passage of a roping and the suspension of the elevator.

In said arranging the elevator car 1 and counterweight to be vertically movable in the hoistway H comprises suspending the elevator car 1 and counterweight 2 with a hoisting roping 21 passing around a drive wheel 19. FIG. 6 illustrates preferred details of how the roping 21 passes.

Figure 7:
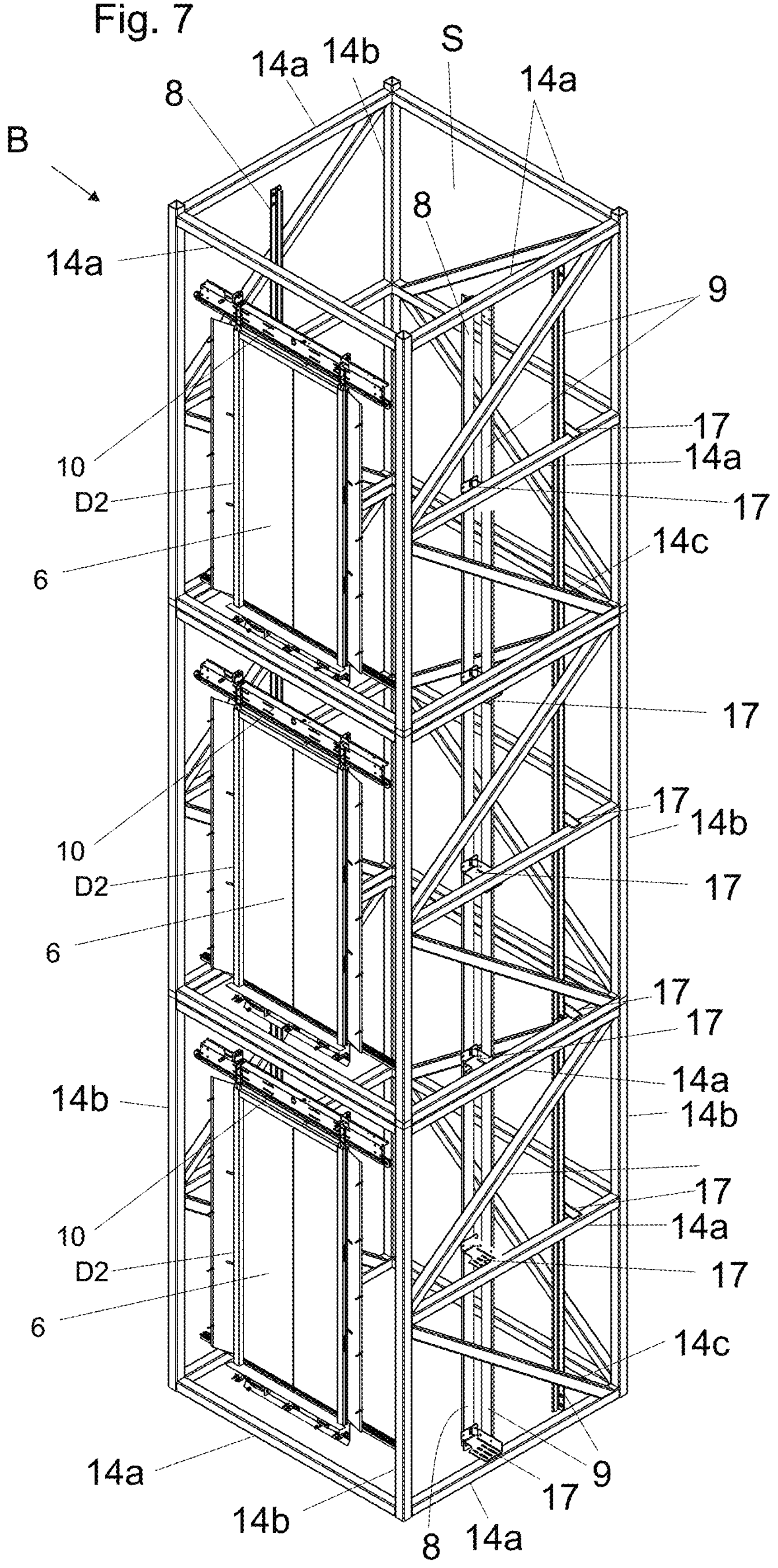
FIG. 7 illustrates preferred details of a prefabricated intermediate module.

FIG. 7 illustrates preferred details of the prefabricated intermediate module B. The prefabricated intermediate hoistway module B illustrated in FIG. 7 comprises guide rail sections 8 of two guide rail lines for guiding the elevator car 1 and guide rail sections 9 of two guide rail lines for guiding the counterweight 2. The prefabricated intermediate hoistway module B comprises a doorway D2 leading away from the hoistway space S of the module in question, and hoistway door 6 for openably covering at least partially the hoistway doorway D2. Since the hoistway door 6 is comprised in the prefabricated intermediate module B, the most laborious installation work thereof can be done already at the factory where the module is fabricated. Thus, no time consuming work needs to be done at the installation site, and the elevator can be installed swiftly and with small amount of disturbance to other operations at the construction site.

In the illustrated embodiment, the door 6 is a sliding door mounted on one or more door guide rails 10 mounted on the frame F of prefabricated intermediate hoistway module B. During the piling, the door 6 is locked immovable relative to the frame F of prefabricated intermediate hoistway module B.

Figure 8:
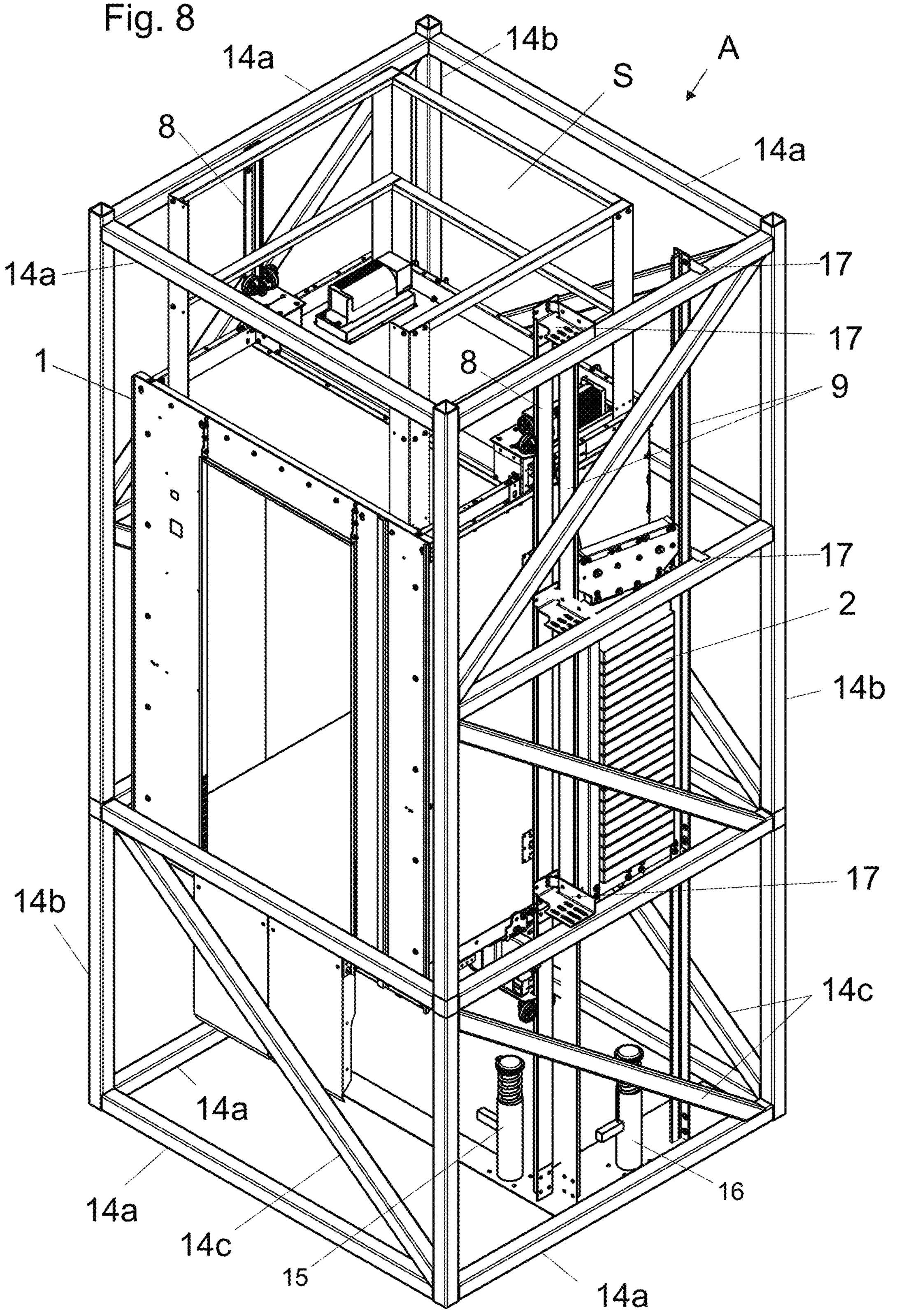
FIG. 8 illustrates preferred details of a prefabricated pit module.

FIG. 8 illustrates preferred details of the prefabricated pit module A. The prefabricated intermediate pit module A illustrated in FIG. 8 comprises guide rail sections 8 of two guide rail lines for guiding the elevator car 1 and guide rail sections 9 of two guide rail lines for guiding the counterweight 2. The prefabricated pit module A preferably also comprises a doorway leading away from the hoistway space S of the module in question, and hoistway door for openably covering at least partially the hoistway doorway, although these are not illustrated in FIG. 8.

An elevator car 1 and a counterweight 2 are inside the hoistway space S of one A of the prefabricated pit module A. The prefabricated pit module A comprises buffers 15, 16, including a buffer 15 for stopping descent of the elevator car 1 and a buffer 16 for stopping descent of a counterweight 2.

In the embodiment of FIG. 9, the tubular frame F' of each said prefabricated hoistway module A',B',C' is a is a concrete frame F', which comprises concrete or reinforced concrete, concrete or reinforced concrete preferably forming more than 50% of the weight of the frame F'. The concrete frame F' comprises four vertical concrete walls rigidly connected together.

FIGS. 9-12 illustrate preferred details of the prefabricated modules A',B',C'. Each prefabricated module A',B',C' comprises guide rail sections 8 of two guide rail lines for guiding the elevator car 1 and guide rail sections 9 of two guide rail lines for guiding the counterweight 2. Each said car guide rail section 8, and each said counterweight guide rail section 9 is fixed on a the concrete frame F' in particular with at least one fixing bracket 17. In the embodiment of FIG. 9, each frame F' comprises one or more horizontal metal beams 23 embedded in concrete thereof. Each said metal beam 23 forms an integral part of a wall of the concrete frame F'. Each said guide rail section 8 of a guide rail line for guiding the elevator car 1 is fixed on a horizontal beam 23 of a frame F' of a prefabricated module A',B',C', in particular with at least one fixing bracket 17.

The prefabricated top module C' comprises a machinery 13 for driving a hoisting roping correspondingly as presented in FIG. 4. FIG. 6 illustrates preferred details of how the roping 21 passes.

FIG. 6 illustrates a preferred layout of the top module C'. The machinery 13 for driving a hoisting roping comprises a motor 18 and a drive wheel 19. The machinery 13 is mounted on a guide rail section 8 of a guide rail line for guiding the elevator car 1 to be vertically carried by the guide rail section 8. Thus, the weight of the machinery 13, as well as the load exerted by the roping passing around the drive wheel 19, is carried by the guide rail section 8, and transmittable by the guide rail section to the guide rail sections below it at least partly so that the complete weight of the of the machinery 13, as well as the load exerted by the roping 21 passing around the drive wheel 19. The load exerted by the roping 21 passing around the drive wheel 19 here is formed partially by weight of the roping 21 and partially by the elevator units, such as car 1 and counterweight 2 suspended by it. The total weight to be carried by the guide rail section 8 on which the machinery is mounted is hereby great. Therefore, the possibility that the guide rail line can carry at least partly the weight is advantageous in facilitating simple mounting of the guide rail sections by a small number of compact and light weighted brackets.

The machinery 13 is mounted on the back-side of a guide rail section 8 by one or more supporting brackets 20 on a guide rail section 8. Here, said back side is the side opposite to the front side the guide rail section 8, which front side is the side on which side the elevator car 1 is arranged movable in the hoistway guided by the guide rail line in question when viewed in vertical direction. The motor 18 and the drive wheel 19 are coaxial, the drive wheel being fixedly connected with the rotor of the motor 18. Hereby, they can be compactly placed on the back side of the guide rail section 8. The motor can be a flat motor, meaning a motor the size of which is substantially smaller in its axial direction than its radial direction. Preferably, the size of the motor in its axial direction is substantially less than 50% of its size in its radial direction.

The prefabricated top module C' moreover comprises rope fixing brackets 12. On each of them, an end of a hoisting roping 21 can be fixed as illustrated in FIG. 6. As illustrated in FIG. 13, a rope fixing bracket 12 (on the left in FIG. 12) is fixed on a fixing bracket 17 of a car guide rail section 8 fixed on a car guide rail section 8 and on a horizontal beam 23 of the frame F'. This is advantageous since hereby the car guide rail section 8 and the rope fixing bracket 12 are positioned laterally relative to each other and relative to the frame F'. Also, hereby the guide rail line can at least partially carry the load exerted on the rope fixing bracket 12 by the roping 21. As illustrated in FIG. 13, a rope fixing bracket 12 (on the right in FIG. 12) is fixed on a horizontal beam 22 fixed on a car guide rail section 8 and on a counterweight guide rail section 8, which beam connects these to each other. By aid of the beam 22, the placement of the rope fixing bracket 12 in question can be placed relatively freely. This is advantageous also because hereby the car and counterweight guide rail lines can at least partially carry the load exerted on the rope fixing bracket 12 by the roping 21. An end of a hoisting roping 21 is fixed on each said rope fixing brackets 12.

In the embodiment of FIG. 9, the prefabricated top module C' comprises a doorway leading away from the hoistway space S thereof.

In said arranging the elevator car 1 and counterweight to be vertically movable in the hoistway H comprises suspending the elevator car 1 and counterweight 2 with a hoisting roping 21 passing around a drive wheel 19. FIG. 6 illustrates preferred details of how the roping passes.

Figure 10:
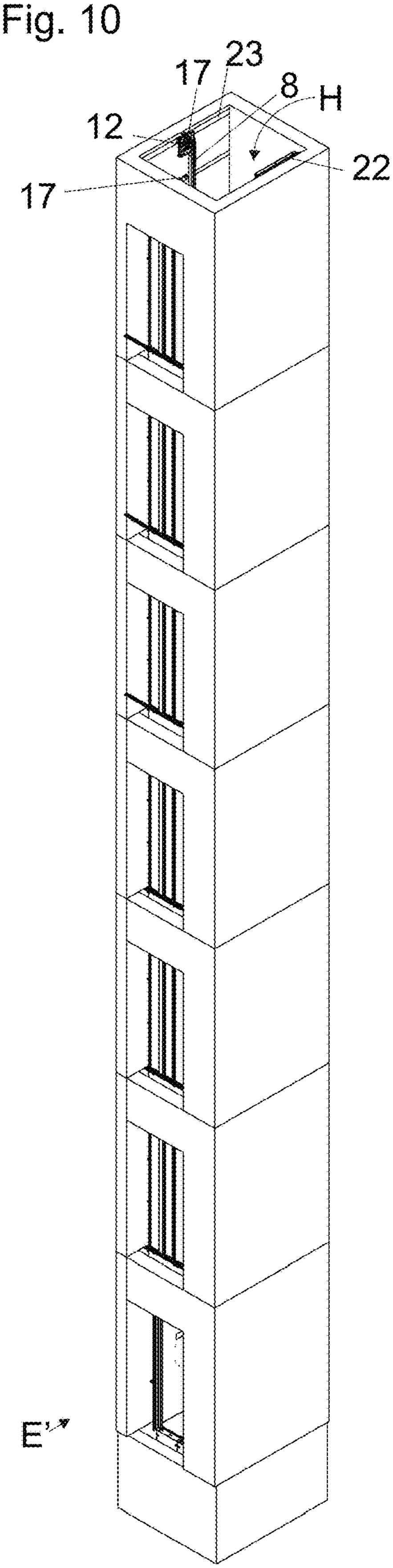
FIG. 10 illustrates an elevator constructed by the method of said second kind.
Figure 11:
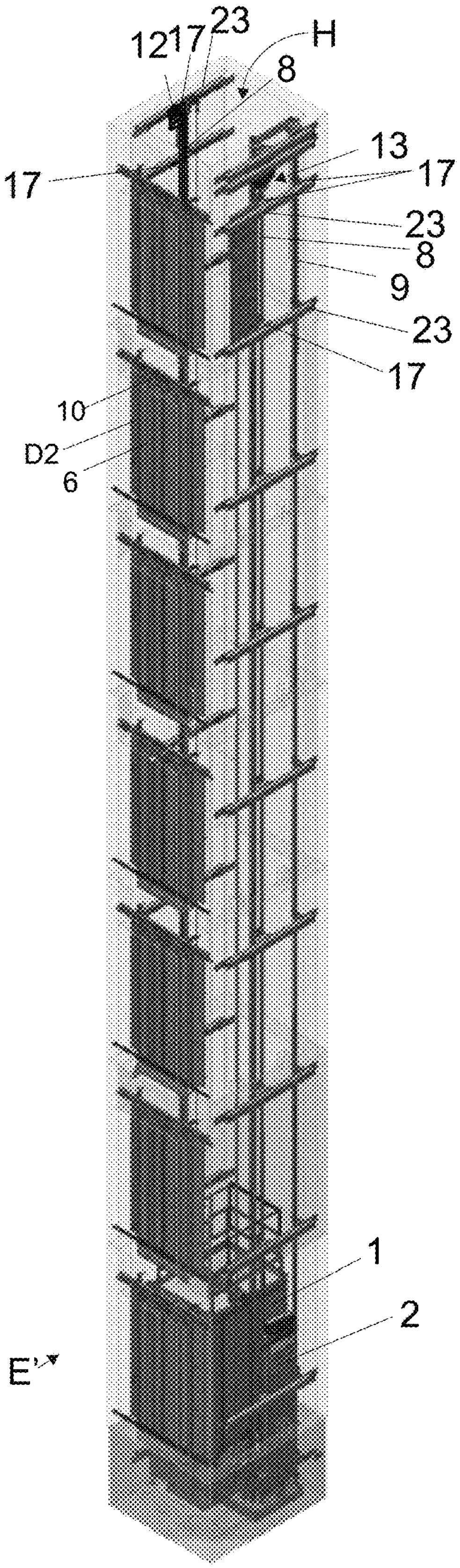
FIG. 11 illustrates an elevator of FIG. 10 the concrete structures thereof being drawn transparent.
Figure 12:
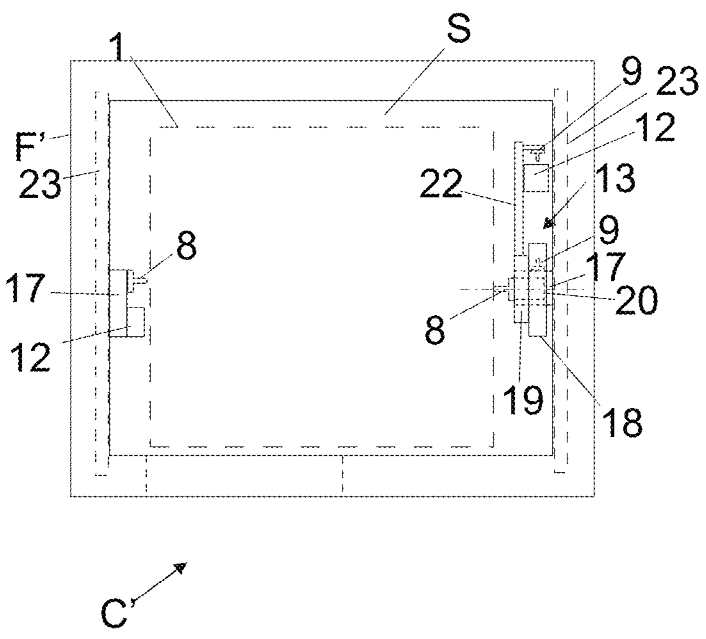
FIG. 12 illustrates preferred details of a prefabricated top module used in the method of the second kind.

FIGS. 9-11 illustrate preferred details of the prefabricated intermediate module B'. The prefabricated intermediate hoistway module B' comprises guide rail sections 8 of two guide rail lines for guiding the elevator car 1 and guide rail sections 9 of two guide rail lines for guiding the counterweight 2. The prefabricated intermediate hoistway module B' comprises a doorway D2 leading away from the hoistway space S of the module B' in question, and hoistway door 6 for openably covering at least partially the hoistway doorway D2. Since the hoistway door 6 is comprised in the prefabricated intermediate module B', the most laborious installation work thereof can be done already at the factory where the module is fabricated. Thus, no time consuming work needs to be done at the installation site, and the elevator can be installed swiftly and with small amount of disturbance to other operations at the construction site.

In the illustrated embodiment, the door 6 is a sliding door mounted on one or more door guide rails 10 mounted on the frame F' of prefabricated intermediate hoistway module B'. During the piling, the door 6 is locked immovable relative to the frame F' of prefabricated intermediate hoistway module B'.

FIGS. 9-11 illustrate preferred details of the prefabricated pit module A'. The prefabricated intermediate pit module A' illustrated in FIG. 9-11 comprises guide rail sections 8 of two guide rail lines for guiding the elevator car 1 and guide rail sections 9 of two guide rail lines for guiding the counterweight 2. The prefabricated pit module A preferably also comprises a doorway leading away from the hoistway space S of the module in question, and hoistway door for openably covering at least partially the hoistway doorway, although these are not illustrated in FIG. 8.

An elevator car 1 and a counterweight 2 are inside the hoistway space S of the prefabricated pit module A'. The prefabricated pit module A comprises buffers, including a buffer for stopping descent of the elevator car 1 and a buffer for stopping descent of a counterweight 2, correspondingly positioned as illustrated and described in FIG. 8.

When describing features, structures or functions of a prefabricated hoistway module, it is meant the features, structures or functions of the prefabricated hoistway modules to be piled on top of each other provided in said providing.

Generally, each said guide rail section 8, 9 is preferably made of metal and has a T-shaped cross section, as illustrated. Thereby, normal elevator components in this sense can be used. The material and/or shape of the guide rail sections 8 and/or 9 of course could alternatively be different.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for constructing an elevator, comprising
providing an elevator car;
providing a plurality of prefabricated hoistway modules to be piled on top of each other, each separate prefabricated hoistway module of the plurality of prefabricated hoistway modules bordering a separate hoistway space into which an entire elevator car or at least an upper or lower end thereof can be fitted to move, such that the plurality of prefabricated hoistway modules border separate, respective hoistway spaces into which the entire elevator car or at least the upper or lower end thereof can be fitted to move;
piling the plurality of prefabricated hoistway modules on top of each other to form a piled plurality of prefabricated hoistway modules, such that the separate, respective hoistway spaces of the plurality of prefabricated hoistway modules are vertically aligned with each other to form a continuous vertically elongated hoistway where the elevator car can be fitted to move; and
arranging the elevator car to be vertically movable in the hoistway space,
wherein the plurality of prefabricated hoistway modules includes a prefabricated top module, the prefabricated top module being an uppermost prefabricated hoistway module in the piled plurality of prefabricated hoistway modules, and
wherein the prefabricated top module includes
a machinery configured to drive a hoisting roping, and one or more car guide rail sections,
wherein the machinery configured to drive the hoisting roping is mounted on a single car guide rail section of the one or more car guide rail sections of the prefabricated top module, such that the single car guide rail section is configured to carry both a complete weight of the machinery and a load exerted by the hoisting roping passing around a drive wheel of the machinery,
wherein the single car guide rail section and a separate car guide rail section of the one or more car guide rail sections are fixed to different horizontal beams such that the single car guide rail section and the separate car guide rail section are fixed to the horizontal beams configured to be on opposite sides of the elevator car in the hoistway space.

2. The method according to claim 1, wherein
each separate prefabricated hoistway module of the plurality of prefabricated hoistway modules comprises a separate tubular frame around the separate hoistway space of the separate prefabricated hoistway module, such that the plurality of prefabricated hoistway modules include separate, respective tubular frames, and
the separate tubular frame forms a bearing structure of the separate prefabricated hoistway module.

3. The method according to claim 2, wherein
each given tubular frame of each given prefabricated hoistway module underlying the prefabricated top module in the piled plurality of prefabricated hoistway modules carries a weight of an overlying tubular frame of all prefabricated hoistway modules overlying the given prefabricated hoistway module in the piled plurality of prefabricated hoistway modules.

4. The method according to claim 2, wherein
each separate prefabricated hoistway module of the plurality of prefabricated hoistway modules comprises one or more car guide rail sections, such that the plurality of prefabricated hoistway modules include separate, respective car guide rail sections, and
the one or more car guide rail sections are each fixed on the separate tubular frame with at least one fixing bracket.

5. The method according to claim 4, wherein the piling the plurality of prefabricated hoistway modules on top of each other to form the piled plurality of prefabricated hoistway modules causes the separate, respective car guide rail sections of the plurality of prefabricated hoistway modules to become vertically aligned with each other to form one or more continuous vertical guide rail lines configured to guide the elevator car.

6. The method according to claim 2, further comprising:
providing a counterweight,
wherein each separate prefabricated hoistway module of the plurality of prefabricated hoistway modules includes one or more counterweight guide rail sections, such that the plurality of prefabricated hoistway modules include separate, respective counterweight guide rail sections, and wherein the one or more counterweight guide rail sections of the separate prefabricated hoistway module are fixed on the separate tubular frame of the separate prefabricated hoistway module with at least one fixing bracket.

7. The method according to claim 6, wherein the piling the plurality of prefabricated hoistway modules on top of each other to form the piled plurality of prefabricated hoistway modules causes the separate, respective counterweight guide rail sections of the plurality of prefabricated hoistway modules to become vertically aligned with each other to form one or more continuous vertical guide rail lines configured to guide the counterweight.

8. The method according to claim 2, wherein each separate tubular frame of the separate, respective tubular frames is a beam frame.

9. The method according to claim 8, wherein the beam frame comprises the horizontal beams, vertical beams and diagonal beams rigidly connected together.

10. The method according to claim 9, wherein each separate prefabricated hoistway module of the plurality of prefabricated hoistway modules comprises one or more car guide rail sections, and each of the one or more car guide rail sections is fixed with at least one fixing bracket on at least one of the horizontal beams of the beam frame of the separate prefabricated hoistway module; and/or each separate prefabricated hoistway module of the plurality of prefabricated hoistway modules comprises one or more counterweight guide rail sections, and each of the one or more counterweight guide rail sections is fixed with at least one fixing bracket on at least one of the horizontal beams of the beam frame of the separate prefabricated hoistway module.

11. The method according to claim 2, wherein the separate tubular frame of the separate prefabricated hoistway module is a concrete frame comprising concrete or reinforced concrete, the concrete or reinforced concrete forming more than 50% of a weight of the concrete frame.

12. The method according to claim 11, wherein the concrete frame comprises four vertical concrete walls rigidly connected together and bordering the separate hoistway space bordered by the separate prefabricated hoistway module.

13. The method according to claim 11, wherein the concrete frame comprises a horizontal beam embedded in concrete of the concrete frame.

14. The method according to claim 1, wherein the arranging includes arranging the elevator car to be vertically movable in the continuous vertically elongated hoistway along one or more car guide rail lines configured to guide the elevator car.

15. The method according to claim 1, wherein the plurality of prefabricated hoistway modules comprise one or more of a prefabricated pit module, or one or more prefabricated intermediate modules into and through which an entire elevator car can be fitted to move.

16. The method according to claim 1, wherein the prefabricated top module comprises a plurality of car guide rail sections including the single car guide rail section and the separate car guide rail section, a first rope fixing bracket configured to be fixed to a first end of the hoisting roping and further fixed to the separate car guide rail section such that the separate car guide rail section is configured to vertically carry a load exerted by the hoisting roping on the first rope fixing bracket, and a second rope fixing bracket configured to be fixed to a second end of the hoisting roping and further fixed to a horizontal beam that is fixed on both the single car guide rail section and a counterweight guide rail section, such that the single car guide rail section and the counterweight guide rail section are collectively configured to vertically carry a load exerted by the hoisting roping on the second rope fixing bracket, wherein the horizontal beam is fixed on the single car guide rail section independently of the machinery, such that the horizontal beam is configured to transmit a portion of the load exerted by the hoisting roping on the second rope fixing bracket to the single car guide rail section independently of the machinery.

17. The method according to claim 16, wherein the method comprises fixing the first end of the hoisting roping on the first rope fixing bracket and fixing the second end of the hoisting roping on the second rope fixing bracket.

18. The method according to claim 1, wherein one or more prefabricated hoistway modules of the plurality of prefabricated hoistway modules comprises a hoistway doorway leading away from a respective hoistway space of the one or more of prefabricated hoistway modules and a hoistway door for openably at least partially covering the hoistway doorway, the hoistway door being a sliding door mounted on one or more door guide rails mounted on a frame of the one or more of the plurality of prefabricated hoistway modules.

19. An elevator obtained with the method defined in claim 1.

* * * * *